Patented Oct. 16, 1945

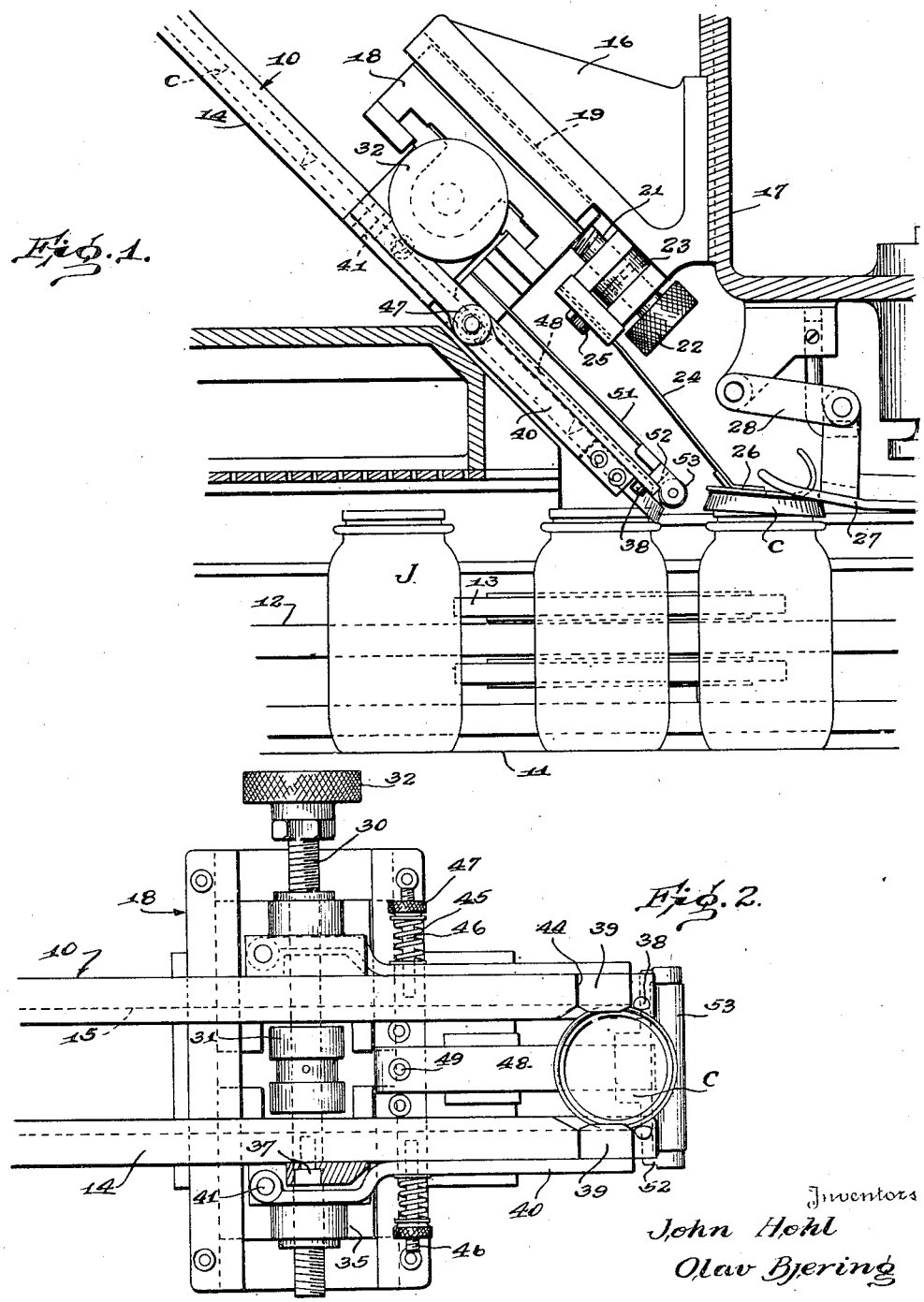

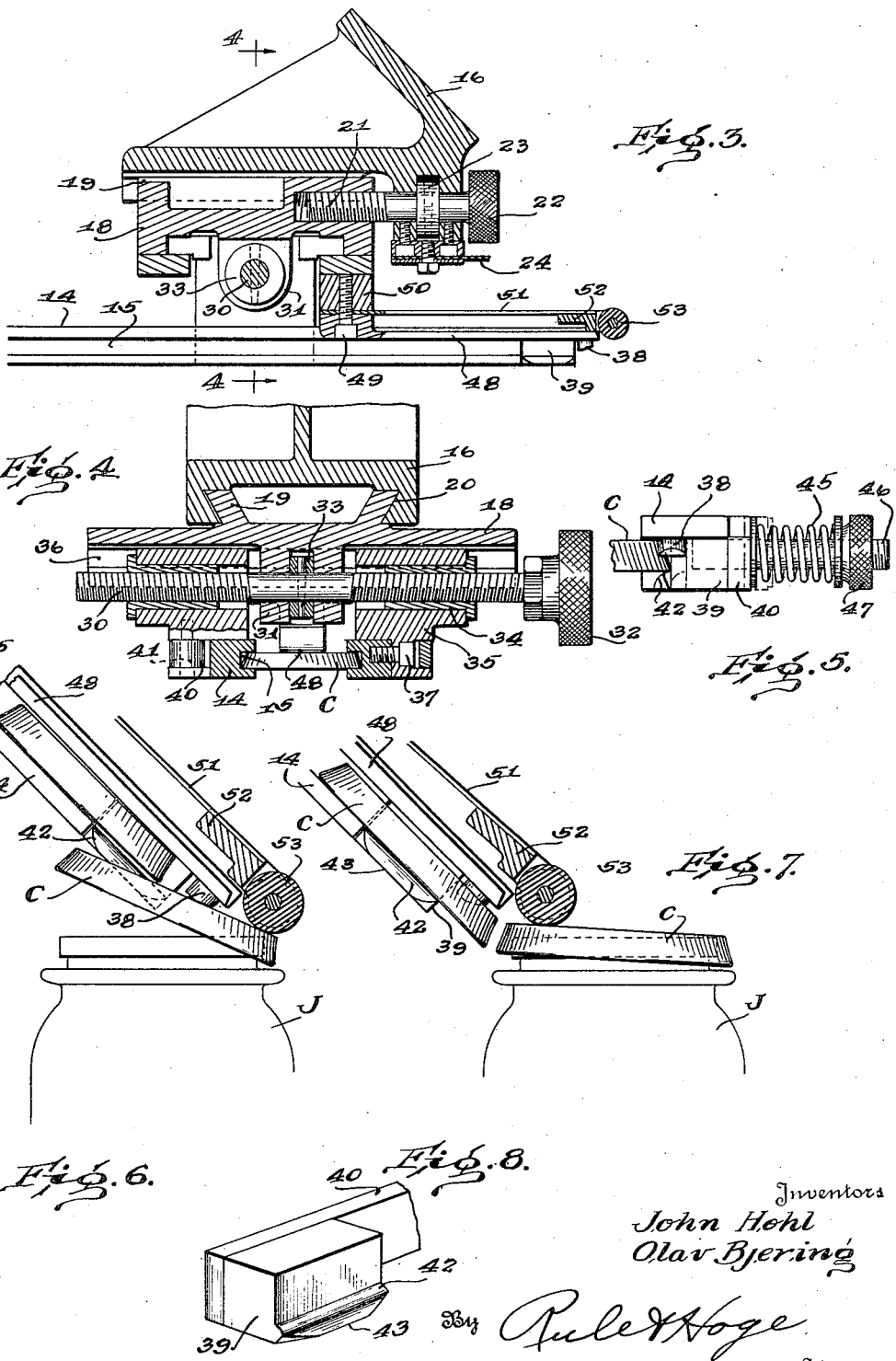

2,386,797

UNITED STATES PATENT OFFICE 2,386,797

JAR CAPPING APPARATUS

John Hohl and Olav Bjering, Toledo, Ohio, assignors to Owens-Illinois Glass Company, a corporation of Ohio Application December 7, 1942, Serial No. 468,094

4 Claims. (Cl. 226—88.1)

Our invention relates to apparatus for assembling closure devices or caps and receptacles, and as herein illustrated is particularly adapted for transferring caps from an inclined chute to jars which have been filled with any desired commodity, preliminary to the cap sealing operation.

An object of our invention is to provide a simple, practical and reliable apparatus for placing the caps on the jars as a continuous series of the jars are advanced in rapid succession to the cap sealing mechanism.

Other objects of our invention will appear hereinafter.

Referring to the accompanying drawings:

Fig. 1 is a part-sectional side elevation of the apparatus.

Fig. 2 is a bottom view of the chute and associated mechanism, looking in a direction normal to the inclined chute.

Fig. 3 is a longitudinal sectional elevation of the mechanism shown in Fig. 2.

Fig. 4 is a cross-section at the line 4—4 on Fig. 3.

Fig. 5 is a detail view showing the cap holding devices at the lower end of the chute.

Fig. 6 is a fragmentary view illustrating the manner in which a cap is released from the chute and swung down onto the jar.

Fig. 7 is a similar view but showing the jar and cap in a more advanced position.

Fig. 8 is a fragmentary perspective view showing one of the spring actuated holding blocks by which the cap is releasably held at the lower end of the chute.

The apparatus as herein shown is a part of a capping machine disclosed and claimed in the patent to John Hohl for Capping machines, No. 2,357,826, dated September 12, 1944.

Referring to the drawings, the receptacles, here shown as jars J, are continuously advanced in an endless procession through an assembling zone in which closure devices or caps C are transferred to the jars from an inclined chute 10. The jars are carried forward on an endless traveling belt conveyor 11 and held against lateral displacement by side belts 12. Rolls 13, of rubber or like material, grip the jars and move them forwardly while the caps are being pulled by the jars from the chute.

The chute 10 comprises a pair of parallel rails 14, the inner sides of which are formed with grooves 15 to receive the margins of the caps C. The chute is suported by a bracket 16 attached to the machine frame or casing 17. A carrier frame 18 which supports the rails 14 and on which parts of the transfer mechanism are mounted, is interposed between the bracket 16 and the said rails. The frame 18 is adjustably mounted in the bracket 16, being formed with ribs 19 (Fig. 4) which are slidable in guideways 20 formed on the bracket. Means for adjusting the carrier 18 along the guideways 20, comprises an adjusting rod 21 rotatably mounted in the bracket and having a screw threaded connection with the carrier. The rod 21 is rotatable by a knob 22 and is held against lengthwise movement in the bracket by a collar 23.

A spring arm 24 is attached by a bolt 25 to the bracket and extends downwardly and forwardly therefrom and at its lower end is provided with a guide plate 26 or wiper beneath which the caps C are carried as they are placed on the jars and by which they are held in place while passing beneath a shoe 27. The end of the shoe adjacent the plate 26 is hung from a pair of links 28 and forms part of the cap sealing mechanism disclosed in said Patent No. 2,357,826.

The guide rails 14 are adjustable toward and from each other by means including an adjusting rod 30 journalled in bearing lugs 31 on the carrier 18 and provided with a knob 32. The rod is held against lengthwise movement by a collar 33 keyed thereto between the lugs 31. The rod is formed with right and left-hand screw threads running in bushings 34 secured in slide blocks 35 slidable in guideways 36 in the carrier 18. The blocks 35 are secured by bolts 37 to the rails 14 so that the rails are adjustable in the direction of their length by the knob 22 and toward and from each other by the knob 32.

The caps as they move down the chute are arrested by stop lugs 38 on the under sides of the rails 14 at the lower ends thereof. Each cap as it reaches the lower end of the chute is held by a pair of supporting blocks 39 carried on the free ends of a pair of arms 40, the other ends of which are connected by pivots 41 to the blocks 35. Each block 39 is formed with an integral rib 42 positioned to engage beneath the marginal edge of the cap and form a support therefor as the cap moves beyond the support of the rails and is arrested by the stops 38. As shown in Fig. 8 the ribs 42 are formed with a knife-edge 43.

The holding blocks 39 (see Fig. 2) are interposed between the stops 38 and the juxtaposed ends 44 of the lower portion of the rails 14 which are cut away to accommodate the said blocks and to release the caps to the control of the blocks so that the caps may be swung downward as presently described, onto the jars. The blocks are yieldingly held in position by means of coil springs 45 mounted on rods 46 which are attached to the rails. The springs are held under compression between the arms 40 and adjusting nuts 47 threaded on said rods.

A flat bar or finger 48 (Figs. 2 and 3) is attached by a screw 49 to a crossbar 50 of the carrier 18 and extends forwardly and downwardly between and parallel with the rails 14, the forward end of said finger terminating between the stop lugs 38. Directly over and parallel with the finger 48 is a spring arm 51, the upper end of which is also attached by the screw 49. Secured to the lower end of the arm 51 is a crossbar or bracket 52 in which is journalled a pressure roll 53. The bar 52 normally rests on the finger 48.

The operation is as follows:

Each jar as it moves forward engages the inner flange surface of the lowermost cap in the chute, which cap at the time is held against the stops 38 (as shown in Figs. 1 and 2) with the cap between the holding blocks 39 and with the rim of the cap resting on the ribs 42. As the jar engages the cap and pulls it forward, the cap is sprung downwardly or given an initial downward tilting movement by the pressure of the stops 38 against the beveled edge of the cap. The cap is thus released from the stops. At the same time, this initial downward tilting of the cap causes the latter to spring the blocks 39 outwardly permitting the cap to swing downward beneath said blocks. The finger 48 overlying the cap then continues to tilt it downward about the contacting edge of the jar as a fulcrum. The cap is thus released from the holding blocks 39 leaving it free to drop down onto the jar. As the jar continues its forward movement, the roll 53 applies to the cap a yielding downward pressure which is maintained until the cap passes beneath the spring pressed guide plate 26.

Modifications may be resorted to within the spirit and scope of our invention.

We claim:

1. Apparatus for assembling jars and caps comprising an inclined chute providing a guideway for the caps, stops fixedly connected to the chute at the lower end thereof and in a position relative thereto to arrest the caps in their downward movement, holding blocks positioned adjacent to the lower end of the chute, said holding blocks having beveled supporting surfaces behind the stops in position to engage beneath the margin of a cap at opposite sides of the cap while the latter is held against said stops, spring means for yieldingly holding said blocks in said position, and means for tilting a cap downward from said position in contact with the said stops and thereby moving the cap downwardly between said blocks to a position beneath the blocks.

2. The combination of a chute comprising parallel, horizontally-spaced, inclined guide rails along which caps are guided downwardly and forwardly, means for arresting each cap at the lower end of the chute, a carrier frame on which the guide rails are carried, means providing an adjustable connection between the guide rails and carrier by which the guide rails are adjustable toward and from each other on the carrier, said last mentioned means including horizontal guideways in the carrier frame and extending transversely of the guide rails, slide blocks slidable in said guideways, means connecting the slide blocks with the guide rails, and an adjusting rod formed with right and left-hand screw threads having screw-threaded connection with said slide blocks, said adjusting rod being journaled in the carrier frame, a stationary supporting bracket for the carrier frame, said supporting bracket having a lower inclined surface parallel with the guide rails and spaced thereabove, said inclined surface of the bracket being formed with a guideway extending parallel with the guide rails, said carrier frame being formed with ribs slidable lengthwise in said guideway, and a screw-threaded adjusting rod journaled in said bracket and having a screw-threaded connection with the carrier frame and extending parallel with the guide rails, thereby providing means for adjusting the carrier frame and guide rails in a direction lengthwise of said rails.

3. The combination of an inclined chute providing a guideway along which caps are fed forwardly and downwardly, stops mounted in a fixed position on the chute in the path of the caps at the lower end of the chute, said stops being at opposite sides of the guideway in position to engage the margin of each cap as the cap moves off the lower end of the chute, thereby arresting the cap, spring means for releasably holding the cap at the lower end of the chute and in contact with said stops, a finger mounted over said guideway in position to overlie the cap while the latter is held by said spring-holding means and to apply a downward pressure to the cap and cause said stops and finger to release the cap from said holding means when pressure is applied in a forward direction to the lower marginal portion of the cap.

4. The combination of an inclined chute comprising parallel guide rails along which caps are guided downwardly and forwardly, means for arresting each cap at the lower end of the chute, a carrier frame providing a support for the guide rails, means for adjustably connecting the guide rails to the underside of said carrier frame, for adjustment toward and from each other, said connecting means comprising slide blocks slidably mounted on the carrier frame for movement in a direction transverse to the rails and to which slide blocks the rails are connected, a screw-threaded adjusting rod journaled in the carrier frame and having screw-threaded connection with said slide blocks, a stationary bracket positioned over the carrier frame and to which the carrier frame is slidably connected for movement in a direction parallel with the guide rails, and means for adjusting the carrier frame in said direction.

JOHN HOHL.
OLAV BJERING.